UNITED STATES PATENT OFFICE.

HENRY BLUMENBERG, JR., OF NEW YORK, N. Y.

BATTERY COMPOUND.

SPECIFICATION forming part of Letters Patent No. 652,309, dated June 26, 1900.

Application filed October 10, 1899. Serial No. 733,127. (No specimens.)

*To all whom it may concern:*

Be it known that I, HENRY BLUMENBERG, Jr., a citizen of the United States, residing at New York, (Wakefield,) in the borough of Bronx, State of New York, have invented an Improvement in Battery Compounds, of which the following is a specification.

The object of my invention is to produce a battery compound superior to sal-ammoniac as used in the ordinary carbon-zinc-type cell. I have discovered that by adding a chlorate of an alkali or alkali-earth metal to sulfate of aluminium and chlorid of sodium that a superior battery compound is produced. I have also discovered that the depolarizing effect of a battery composed of these materials is regulated by the quantity of chlorate present. The chlorate that I prefer to employ is chlorate of sodium.

The battery compound composed of the above-mentioned salts is especially adapted for all kinds of open-circuit work—such as ordinary bell-work, telephones, and railway-crossing signals—and is especially available under the trying conditions of severe and constant use.

I have also discovered that a chlorate of an alkali or alkali-earth metal, together with a sulfate of aluminium and the chlorid of sodium, can be used to advantage with the ordinary Leclanché battery-cell, which employs peroxid of manganese and zinc, and that therein no harm arises from the use of the chlorate of the alkali or alkali-earth metal, although under certain conditions the use of said chlorate is not absolutely essential.

I have also discovered that the battery compound composed of the chlorate of an alkali or alkali-earth metal, sulfate of aluminium, and chlorid of sodium possesses the following advantages, which advantages are similar to those of other battery compounds heretofore devised by me—that is, no insoluble incrustations are formed on either the zinc or the carbon electrode, the battery depolarizes more rapidly than the ordinary sal-ammoniac battery, and it has a longer life and greater efficiency; and it has the further advantage that when the cell is depleted, like other cells in which sulfate of aluminium is used, the solution becomes of a milky appearance and consistency, which gives warning in advance that it is necessary to renew the cell.

I claim as my invention—

1. A battery compound composed of a chlorid of the metals of the alkalies or alkali-earth metals, a sulfate of aluminium and a chlorate of the metals of the alkalies or alkali-earth metals, substantially as set forth.

2. A battery compound composed of chlorid of sodium, sulfate of aluminium and chlorate of sodium, substantially as specified.

Signed by me this 9th day of October, 1899.

HENRY BLUMENBERG, JR.

Witnesses:
GEO. T. PINCKNEY,
S. T. HAVILAND.